US012643236B2

(12) United States Patent
Sanmartin

(10) Patent No.: US 12,643,236 B2
(45) Date of Patent: Jun. 2, 2026

(54) DEVICE FOR HANDLING PRODUCTS IN CONTAINERS BASED ON MOVEMENT BY ELASTIC PRESSURE ON THE TOP OF THE CONTAINERS

(71) Applicant: MAQUINAS SANMARTIN LTDA, Caxais do Sul (BR)

(72) Inventor: Jose Bernardo Sanmartin, Barrio Cidade Nova (BR)

(73) Assignee: Máquinas Sanmartin Ltda, Caxias do Sul (BR)

( * ) Notice: Subject to any disclaimer, the term of this patent is extended or adjusted under 35 U.S.C. 154(b) by 359 days.

(21) Appl. No.: 18/276,048

(22) PCT Filed: Feb. 17, 2021

(86) PCT No.: PCT/BR2021/050071
§ 371 (c)(1),
(2) Date: Aug. 7, 2023

(87) PCT Pub. No.: WO2022/170406
PCT Pub. Date: Aug. 18, 2022

(65) Prior Publication Data
US 2024/0100703 A1 Mar. 28, 2024

(30) Foreign Application Priority Data
Feb. 9, 2021 (BR) ........................ 20 2021 0024165

(51) Int. Cl.
*B25J 9/16* (2006.01)
*B25J 13/08* (2006.01)
(Continued)

(52) U.S. Cl.
CPC ........... *B25J 9/1687* (2013.01); *B25J 13/082* (2013.01); *B25J 15/0408* (2013.01);
(Continued)

(58) Field of Classification Search
CPC .... B25J 9/1687; B25J 13/082; B25J 15/0408; B25J 17/0225; B65G 47/905;
(Continued)

(56) References Cited

U.S. PATENT DOCUMENTS

2020/0270072 A1* 8/2020 Sforacchi ............. B65G 47/905
2022/0152840 A1* 5/2022 Sanmartin ........... B65G 47/086

FOREIGN PATENT DOCUMENTS

CN 210879295 U * 6/2020
WO WO-2020191467 A1 * 10/2020 ........... B65G 47/086

* cited by examiner

*Primary Examiner* — Zhipeng Wang
(74) *Attorney, Agent, or Firm* — Maier & Maier, PLLC

(57) ABSTRACT

The present utility model refers to a device coupled to a robot or another moving system, exerting elastic pressure on the upper part over can containers, allowing to keep the products to be moved as fixed, displacing and turning them, defining their positions and organizing them for later palletization, enhanced with the introduction of locking pins, side wings, a lower metal plate covered by an elastic polymer with an innovative checkerboard design and a compression spring system, in the field of application intended to the industry and distribution centres for beverage and food, in the area of preparation of product container layers, ready before palletization.

2 Claims, 24 Drawing Sheets

Figure 1:
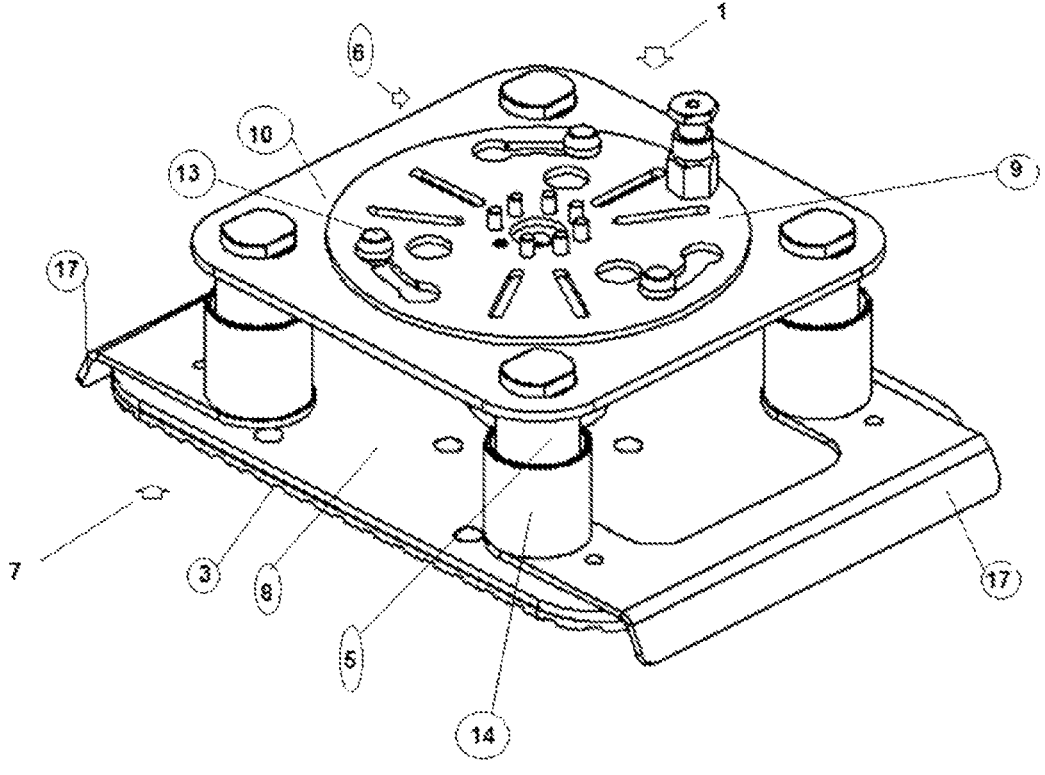

(51) Int. Cl.

| | |
|---|---|
| *B25J 15/04* | (2006.01) |
| *B65G 47/90* | (2006.01) |
| *B65G 57/24* | (2006.01) |
| *B65G 61/00* | (2006.01) |

(52) U.S. Cl.
CPC ........... *B65G 47/905* (2013.01); *B65G 57/24* (2013.01); *B65G 61/00* (2013.01); *B65G 2201/0235* (2013.01); *B65G 2203/0208* (2013.01); *B65G 2811/061* (2013.01)

(58) Field of Classification Search
CPC ................... B65G 57/24; B65G 61/00; B65G 2201/0235; B65G 2203/0208; B65G 2811/061; B65G 47/908; B65G 59/00; B65G 57/03
See application file for complete search history.

C1

C2

C2

C2

DEVICE FOR HANDLING PRODUCTS IN CONTAINERS BASED ON MOVEMENT BY ELASTIC PRESSURE ON THE TOP OF THE CONTAINERS

This utility model refers to a device coupled to a robot or other moving system, putting elastic pressure over the top of the can containers, allowing to keep the products to be moved as fixed, displacing and turning them, defining their position and organizing them for future palletization, enhanced with the introduction of locking pins, side wings, a lower metal plate covered by an elastic polymer with innovative checkerboard design and a compression spring system, in the field of application of the industry and distribution centers for beverages and foods, in the area of preparation of ready product container layers before palletization.

In the current state of the art by the traditional system to form flexible layers, using robots or other moving devices, there is a limitation in the quantity of cycles per minute per tweezers. To increase system production, alternative feeding systems are added, generating hardware changes in the package feeding system, including of tweezers of various sizes, especially allowing to move more than one package per operation, generating an eventual production discontinuity, increase in the operation area and higher energy consumption.

The U.S. Pat. No. 9,771,220B1 has an activation system located below the transport conveyor, operating by means of a PLC, guiding the rollers and the packages in the desired orientation. That system has an inconvenience, since the whole activation system is positioned below the transport conveyor, causing instability when handling smaller packages due to the activation system by rollers with other difficulties caused by the lack of precision in the position of packages when moved and reduced flexibility, particularly due to a limitation in the quantity of possible movement operations, caused by the mechanical hardware of the system.

From the same owner or applicant, the state of the art includes the patent of invention BR 102019012951-4, comprising a DEVICE FOR HANDLING PRODUCTS IN CONTAINERS, SOLELY OR IN GROUPS, BASED ON THE MOVEMENT BY ELASTIC PRESSURE ON THE TOP OF THE CONTAINERS, referring to a device coupled to a robot or another movement system, putting pressure over the container, allowing to hold the products to be moved, displacing and turning them, defining their position and organizing them for later palletization or positioning the subsequent ones, wherein that device is formed by a metal head, a base set, constituted, in its lower part, by a set constituted by a lower metal plate and covered with an elastic polymer attached to the upper plate of the device by means of a spring system or other elastic element with memory, said system comprising bolts with washers, the lower metal plate and the upper plate being joined in four spots with holes next to the vertices of the upper plate, with coincident attaching points to the base set, and the upper plate having a central hole and flanges. That system showed a few difficulties with stronger friction between the claw and the containers, which may cause premature wearing of the parts, and consequent breaks in the handled products; pin clamping; wear or slack between the upper plate and the lower sleeves; and wear or slack in the attaching spots on the flanges, caused by the system with holes joining them to the upper plate.

An object of this utility model patent application is a device (1) for handling products in containers (C1), based on the movement by elastic pressure on the top of the containers (C1), being the distribution made by said arrangers operating in different axes, under the command of dedicated software for each application and moved by a robot (R1), allowing for the arrangement of can containers, wherein said device and the respective software are adapted for the various types and measurements of containers (C1), solely or in groups, and, within the logics of each program, creates the organization of the configuration of the moved containers for subsequent operations, including the formation of layers for palletization (C2).

In this enhancement or utility model to be disclosed, the device is constituted by a metal structure, a compression spring system (5) with memory to be coupled to the flange of a robot, a set formed by a metal structure and an elastic polymer cover is coupled to the lower part of the device, so to keep the integrity of the containers and allow their movement, wherein, due to the pressure system and the introduction of two side wings (17) on its edges, that lower part of the device set may be smaller than the measurements of the container to be handled.

The device has an adequate coupling for each kind of robot, counting on the tool exchange solution, which is performed automatically, with devices in standby, strategically located in the working area for cases when the products are changed for handling or in case of change of the device.

The device (1) is operated above a flat working area (2) allowing the containers (C1) to enter through their respective conveyors, wherein, when entering the flat working area (2), the containers (C1) are identified by software in a previously established order and adequately moved to the desired formation.

The movement is made by the robot (R1), locating the device (1) over the container (C1) by means of controlled elastic pressure to avoid damage to the container (C1), dragging it lengthwise (L1), crosswise (T1) and rotating (G1) (clockwise and anti-clockwise) over the flat working area (2), positioning the container (C1) in the exact location according to the scheduled arrangement.

By the monitoring routine of the device (1) as included in the software, the system identifies if the device must be substituted when the elastic polymer (3) is reaching the end of its working life, and automatically performs the operation in a device magazine (4) inserted besides the flat working area (2), so to uncouple the worn or damaged device (1) and couple another full device (1), re-starting the operation within seconds, thus avoiding long interruptions. The same procedure may be used in case a setup change in the container (C1) is planned.

An essential feature refers to data standardization to operate the device, which is required to guarantee the attack pressure of the device and the tension of the compression spring system (5) or other elastic system in the container (C1). In both cases, said definition is empirically made, for each kind of product to be handled.

The parameters of the compression spring system (5) are defined, considering the measurements and quality of said elastic system, i. e. higher or lower tension of the material.

The attack pressure of the device (1) is also empirically defined, defining as a base the height of the container (C1) to be operated, and additional advancement gradients on the height of the device. Performance evaluations are made for each configuration and defined by the better performance in positioning precision and device speed (1), always maintaining the integrity of the set.

The device (1) is formed by a metal head (6) or made of another material which may be formed within the appropriate measurements and characteristics (weight and strength), being configured by a base set (7) and a flange (9), for engaging the movement device or robot (R1).

In the lower part of the base set (7) of the device (1), a set constituted by a lower metal plate (8) and covered with an elastic polymer (3) is assembled, having its design changed into a checkerboard shape, so to guarantee more efficient friction between the claw and the container (C1), wherein the base set (7) is fixed to the upper plate (6) of the device (1), by means of a spring system (5), said system comprising bolts (11) and pins, besides the essential constituents joining the lower metal plate (8) to the upper plate (6).

The connection as disclosed above is performed in four spots with holes (12), next to the vertices of the upper plate (10), with coincident fixing spots with the base set (7), being attached to the upper plate (10) by innovative locking pins (13) for said flange (9).

The connection is performed by means of the lower sleeve (14) receiving the spring (5), involving the guide pin (15), projecting from the sleeve (16) which is coupled to the upper plate (10). In between the plate (7) and the lower sleeves (14), side wings (17) are assembled. The course of the system was increased, so to improve the flexibility of the system and the pin (15) was relieved in its diameter, so to avoid being locked during the operation, consequently also increasing the protection ability of the robot under excessive torque.

In the central part of the upper plate (10), there are locking pins (13) receiving the lock set constituted by the flange (9) used for engagement to the mouth of the robot (R1).

The devices used for the connection between the base set (7) and the upper plate (6) have the purpose to regulate and maintain the pressure of the elastic polymer (3), providing the appropriate pressure to keep the set as attached to the device (1), however allowing for the necessary movement over the flat working area (2).

The device (1) has innovative side wings (17) helping to drag the container (C1), reducing the friction coefficient over the conveyor.

The main advantage offered by this enhancement refers to the increase in moving speed, since the present device allows to perform up to one hundred fifty (150) movements per minute, so to reach considerable increase in the number of cycles/minute, with high reliability. Therefore, it is possible to reduce the full investment over conventional devices, for the same production ability, besides lower space occupation (about 50% of the area as required by the traditional systems), thus substantially reducing electricity consumption as involved in the operation.

Another characteristic involved in the present utility model refers to the automatic latch system of the device, particularly indicated in shape change situations (quick setup), by which the operation suffers minimal interruptions, with a quick re-start, improving the efficiency of the operation, besides reducing the stop time of the device provided by the automatic change of an eventually broken device or for the wear and tear of said device during the operation.

Another important advantage obtained with the new device is the reduction of the setup time, assured as a function of the size of the lower part of the device set being smaller than the measurements of the container to be handled. Therefore, there is no need to partially involve the container around its perimeter when handled, since the side wings (17) introduced between the plate (7) and the lower sleeves (14), helping to drag the containers with different sizes, minimizing the need of setup during the changes of shapes of the containers and reducing the friction coefficient over the conveyor.

Furthermore, there is less need of maintenance, in comparison with conventional systems, as a function of the lower friction as provided by the change of the innovative checkerboard design, covered with an elastic polymer (3), reducing the contact between the base (7) and the lower metal plate (8) of the lower part set.

In the lower part of the base in this enhancement, locking pins (13) were included, substituting the holes, so to attach the flange (9), thus improving the junction.

Figure 2:
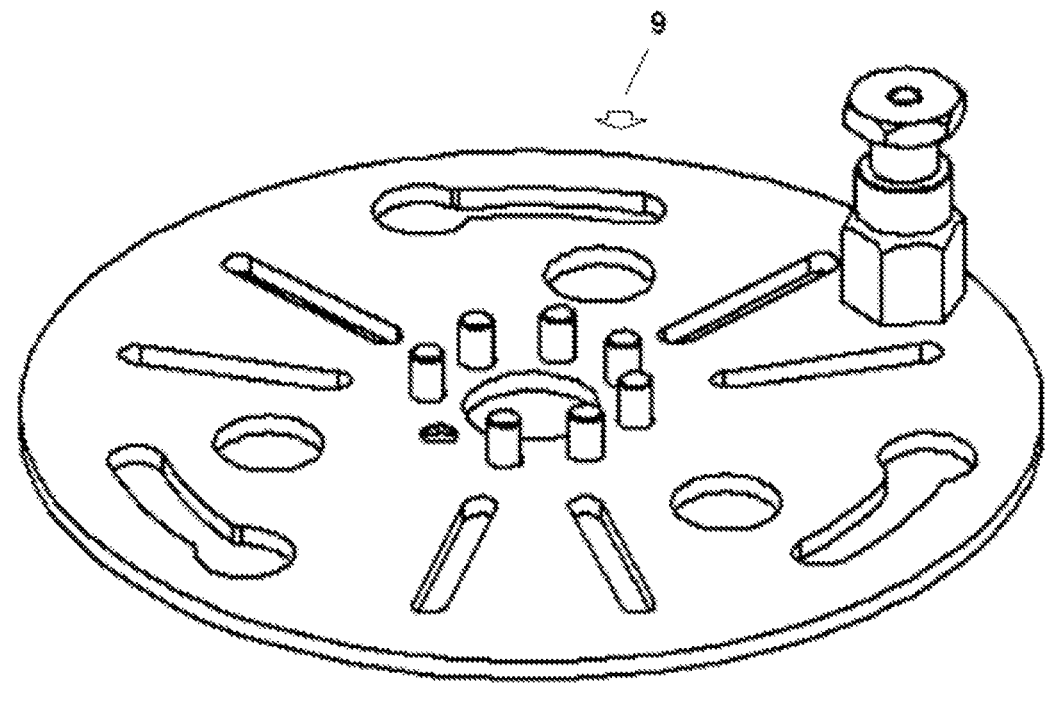
Figure 3:
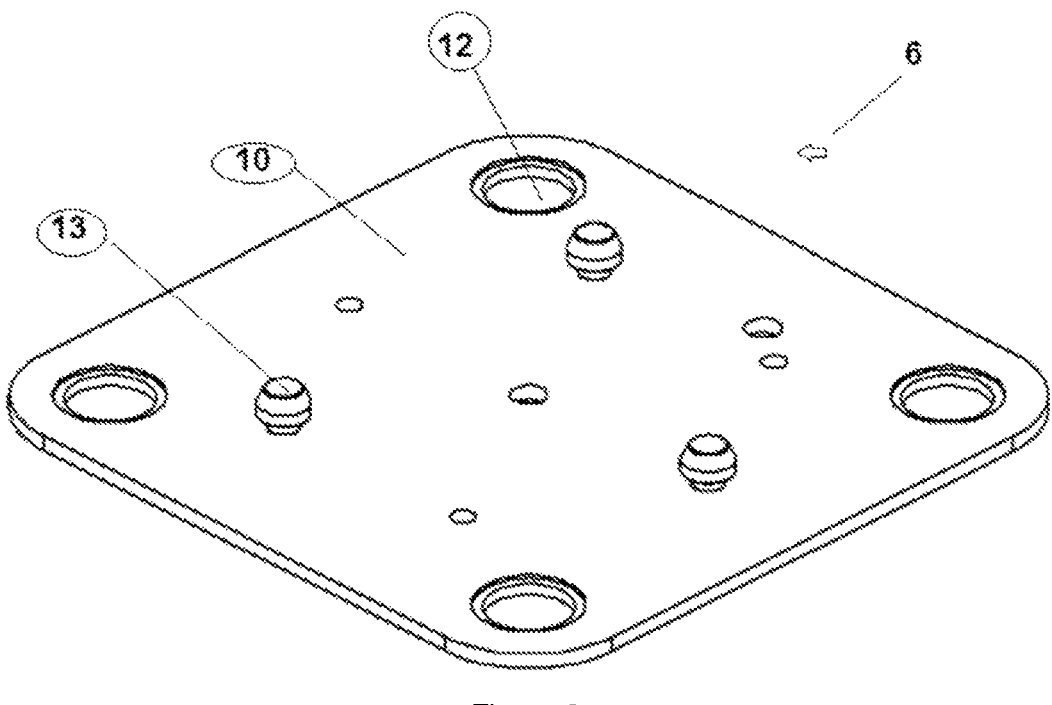
Figure 4:
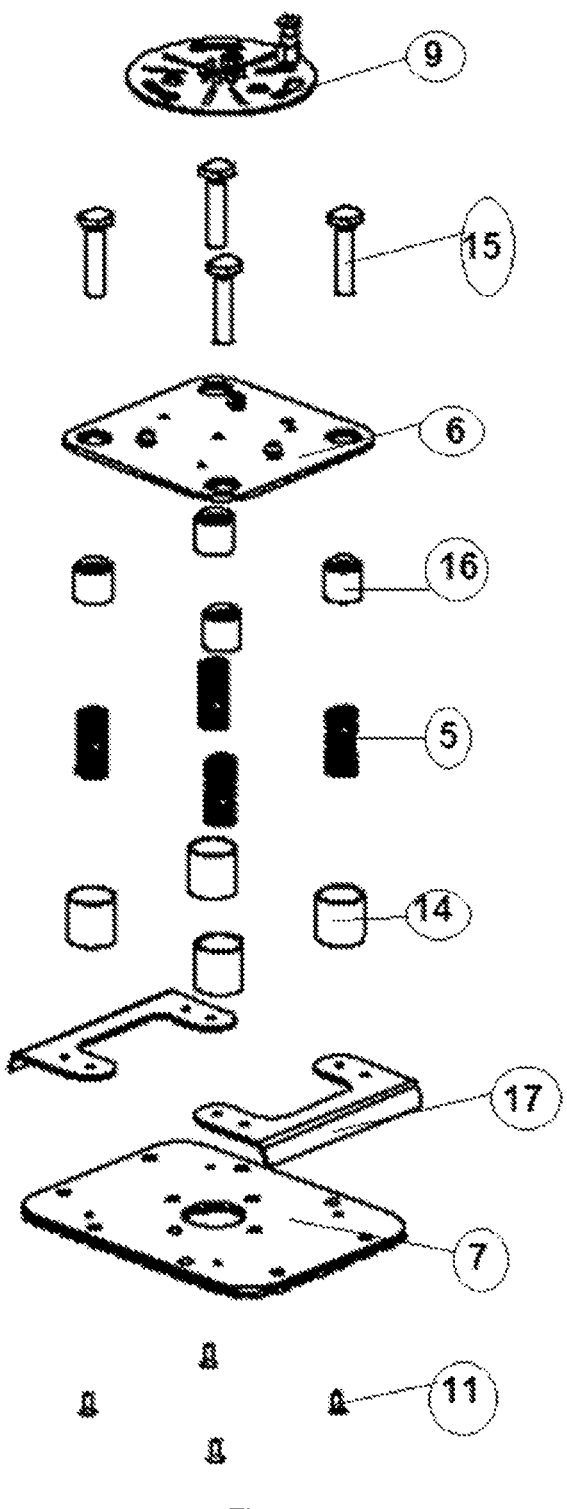
Figure 5:
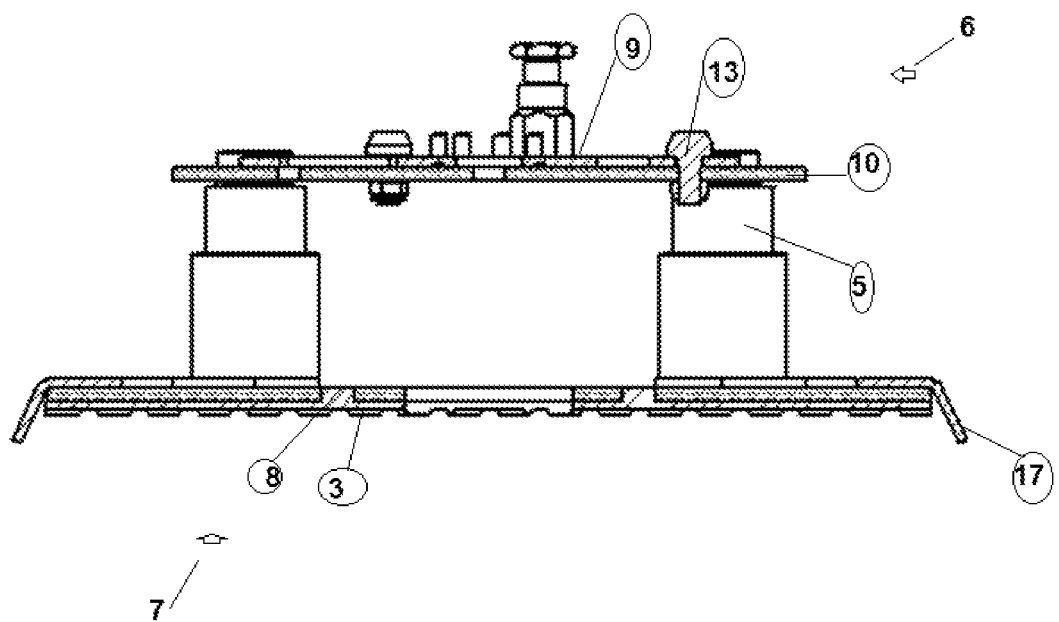
Figure 6:
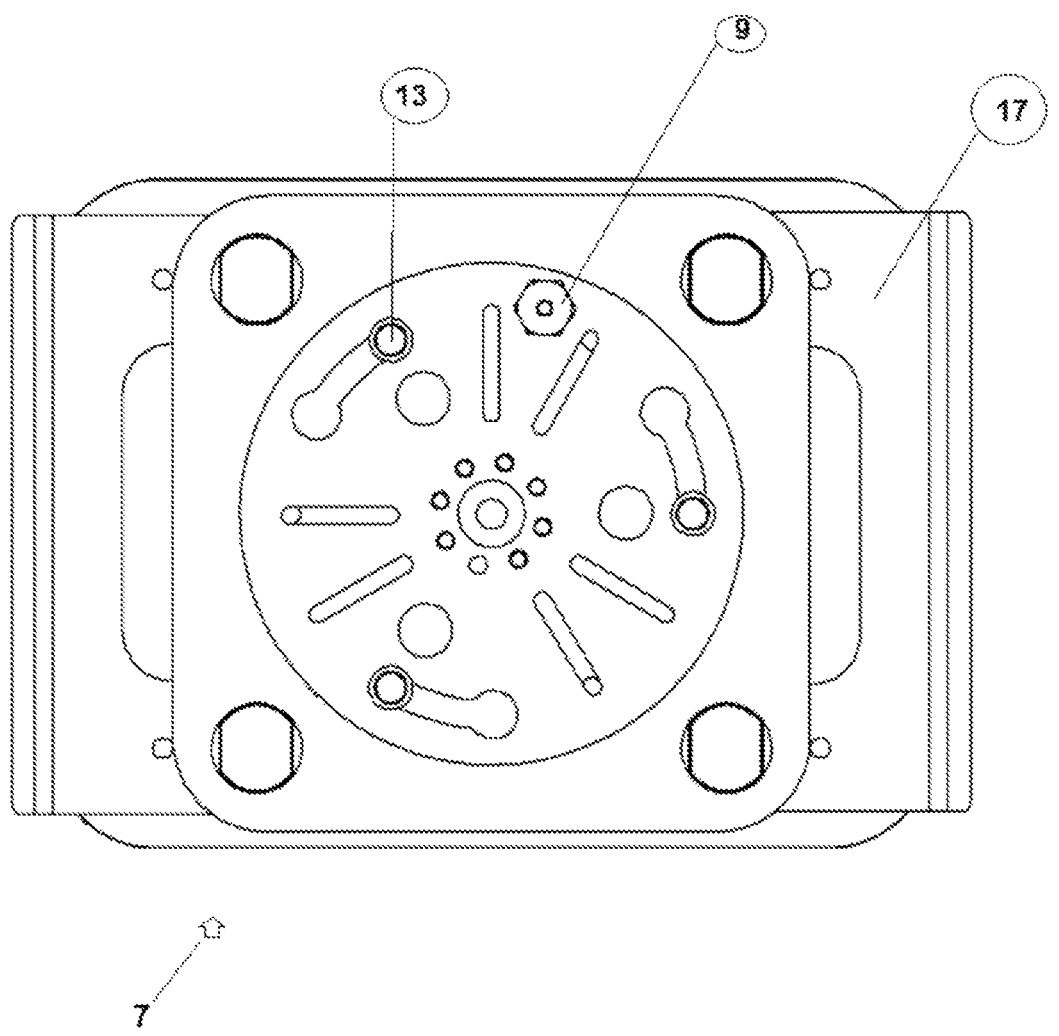
Figure 7:
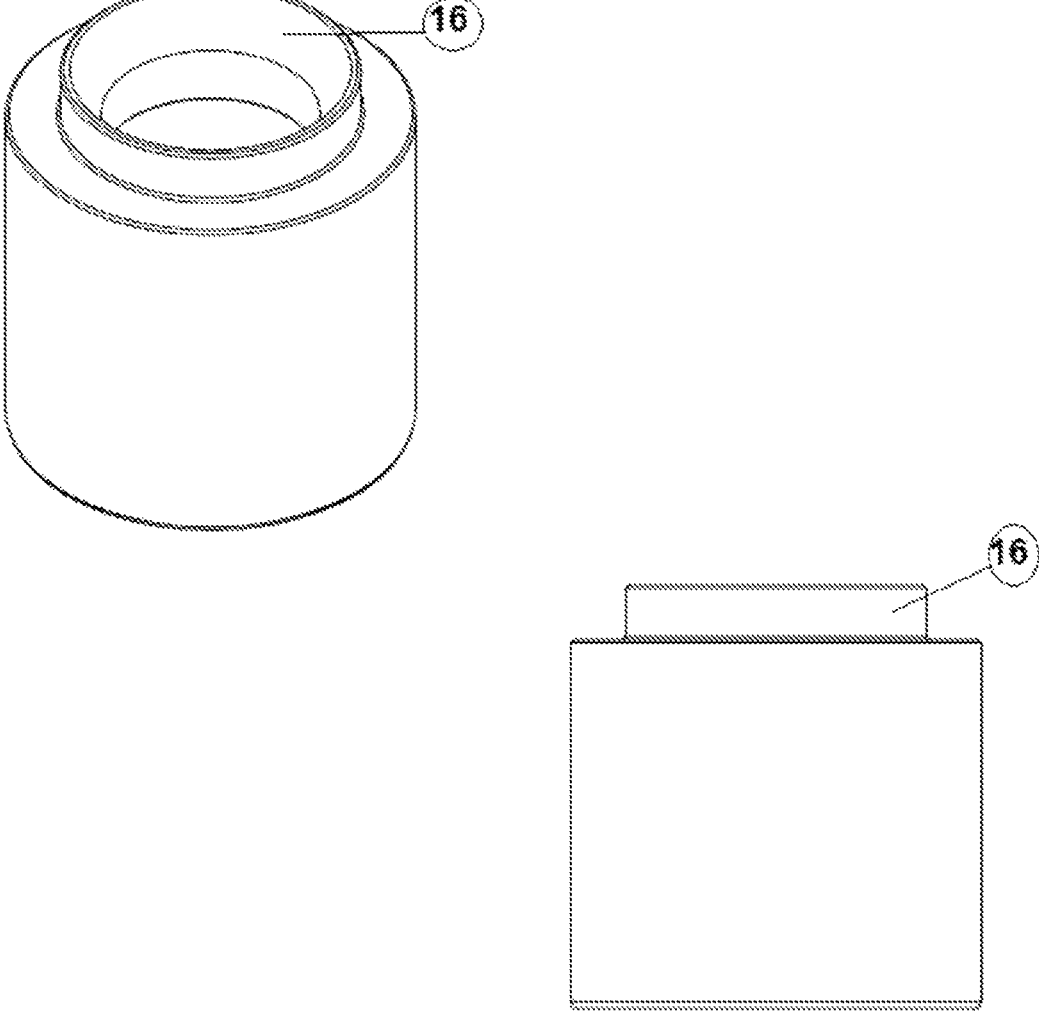
Figure 8:
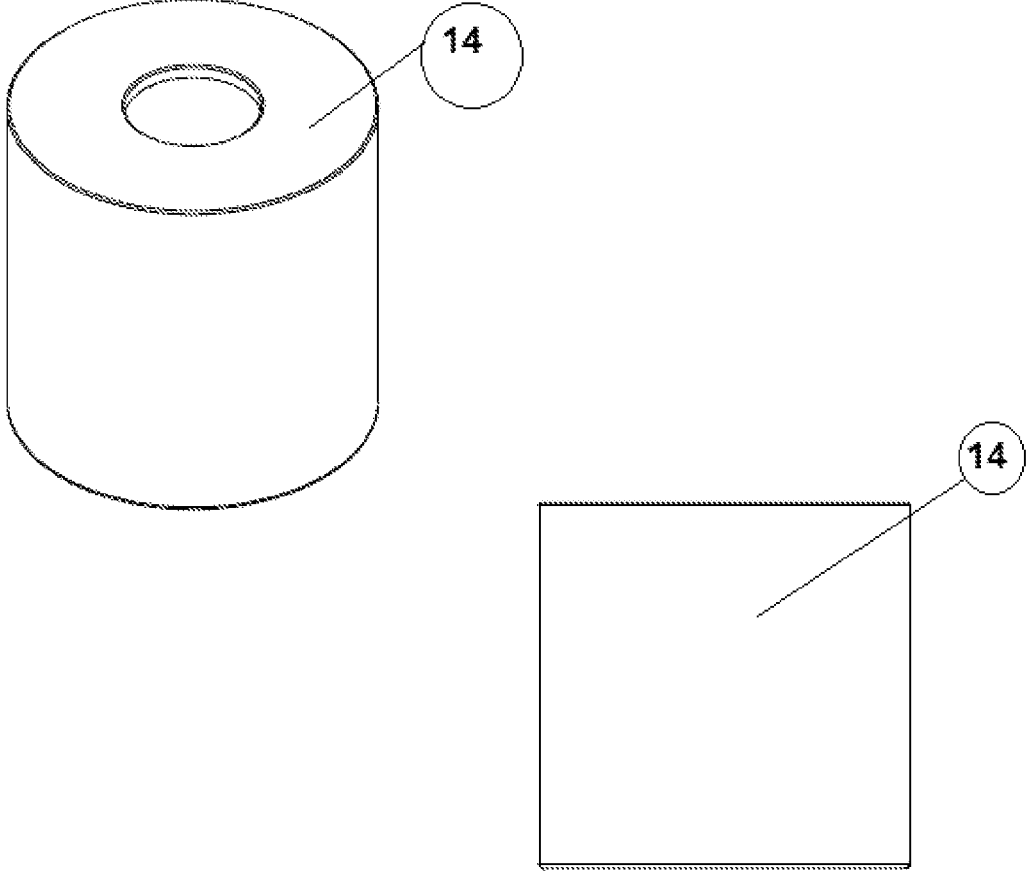
Figure 9:
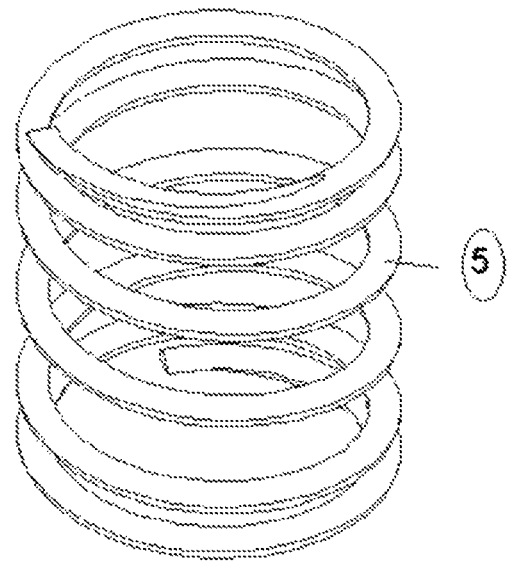
Figure 10:
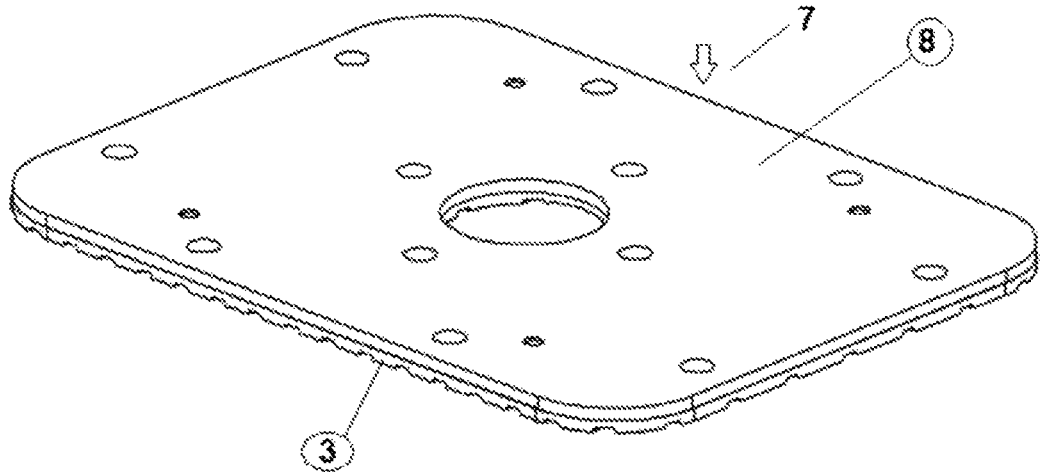
Figure 11:
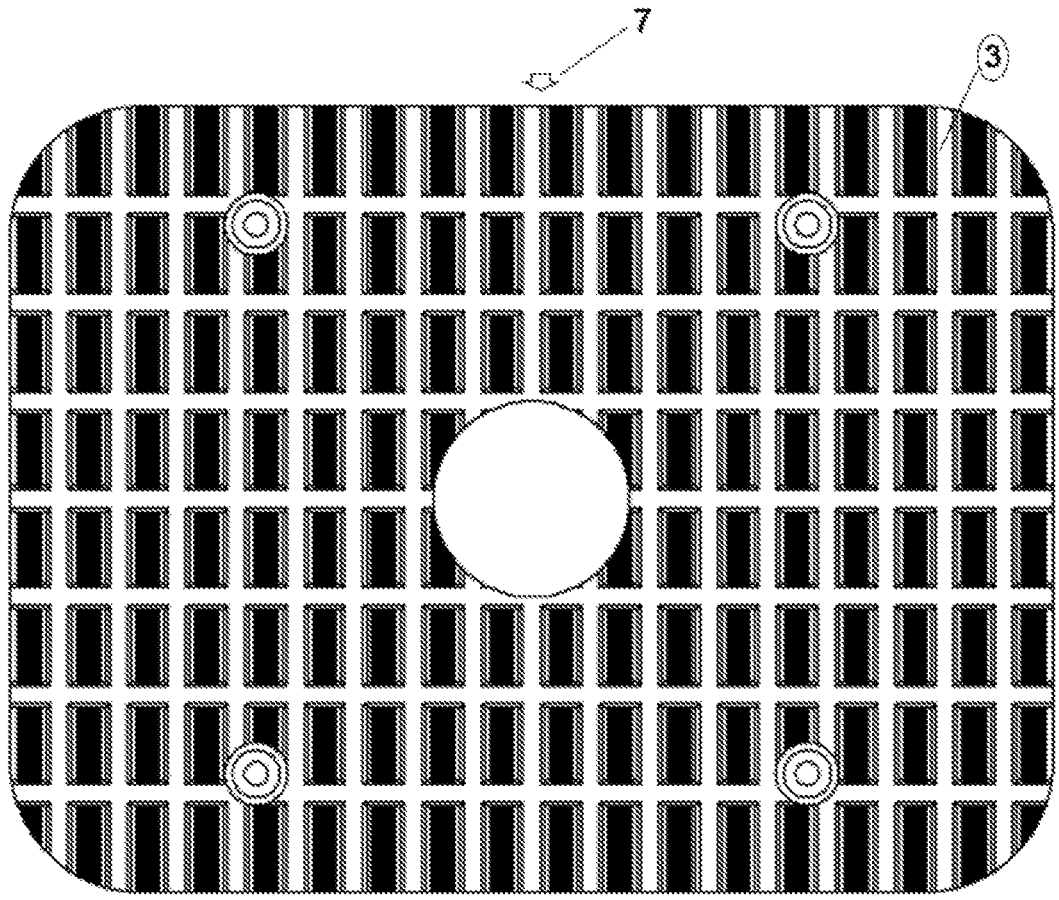
Figure 12:
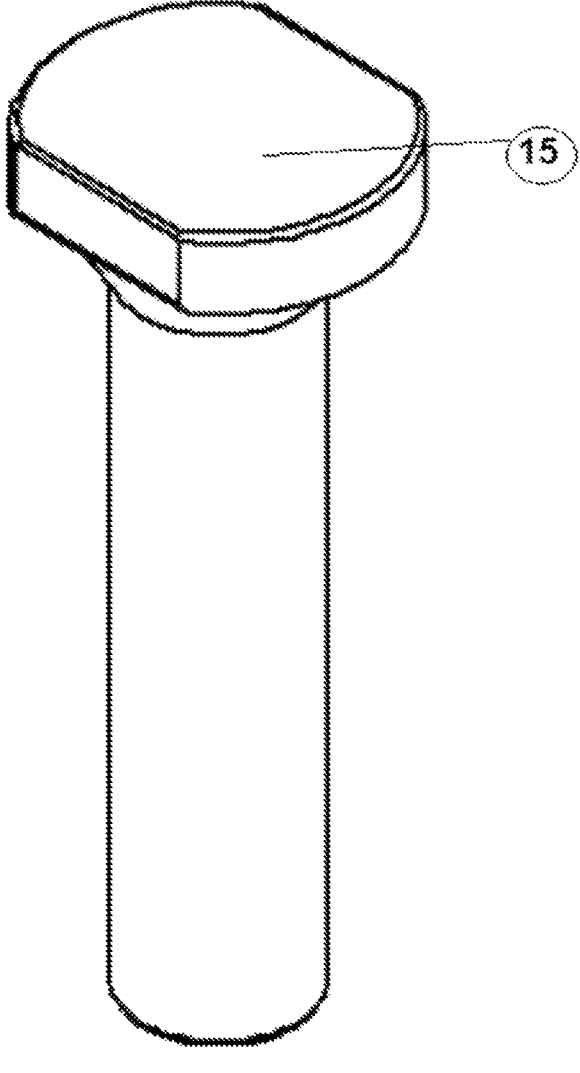
Figure 13:
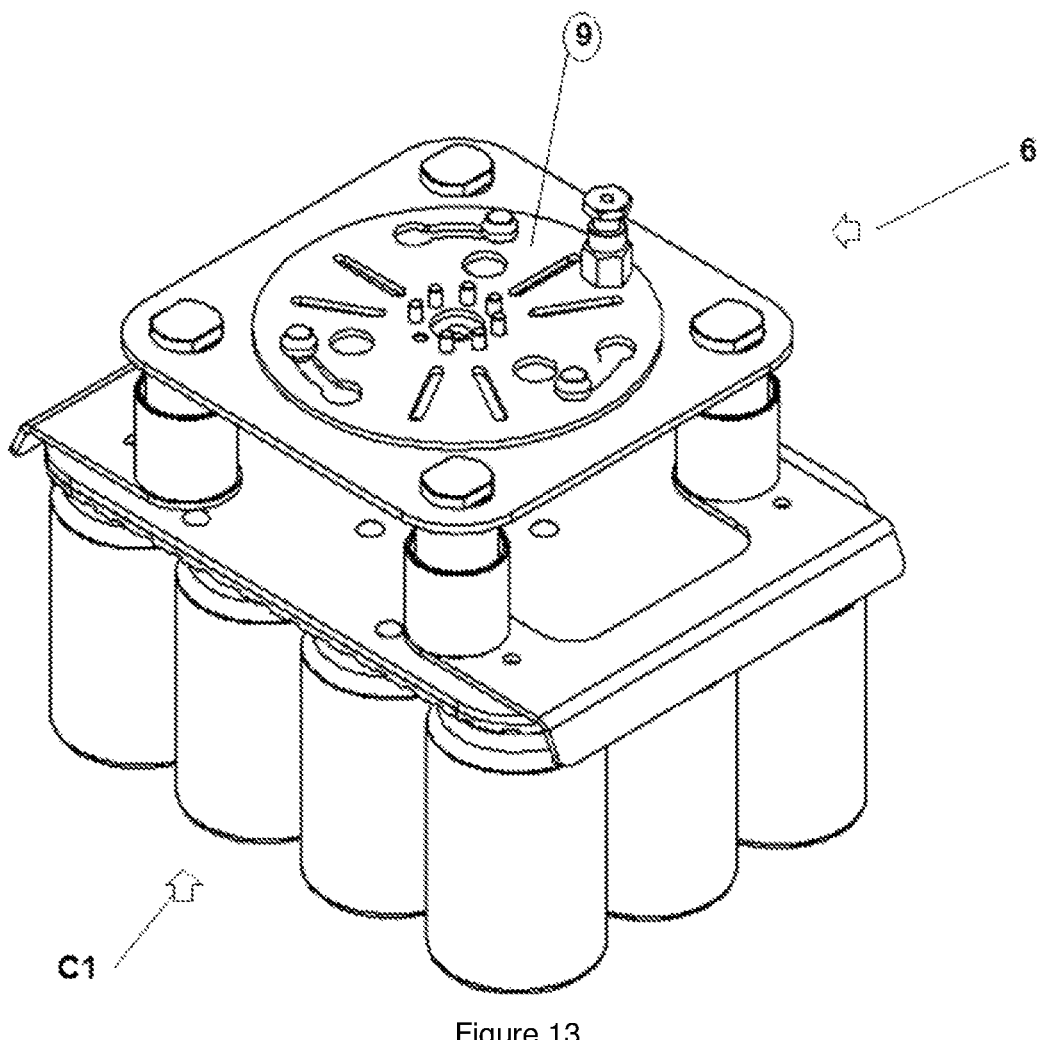
Figure 14:
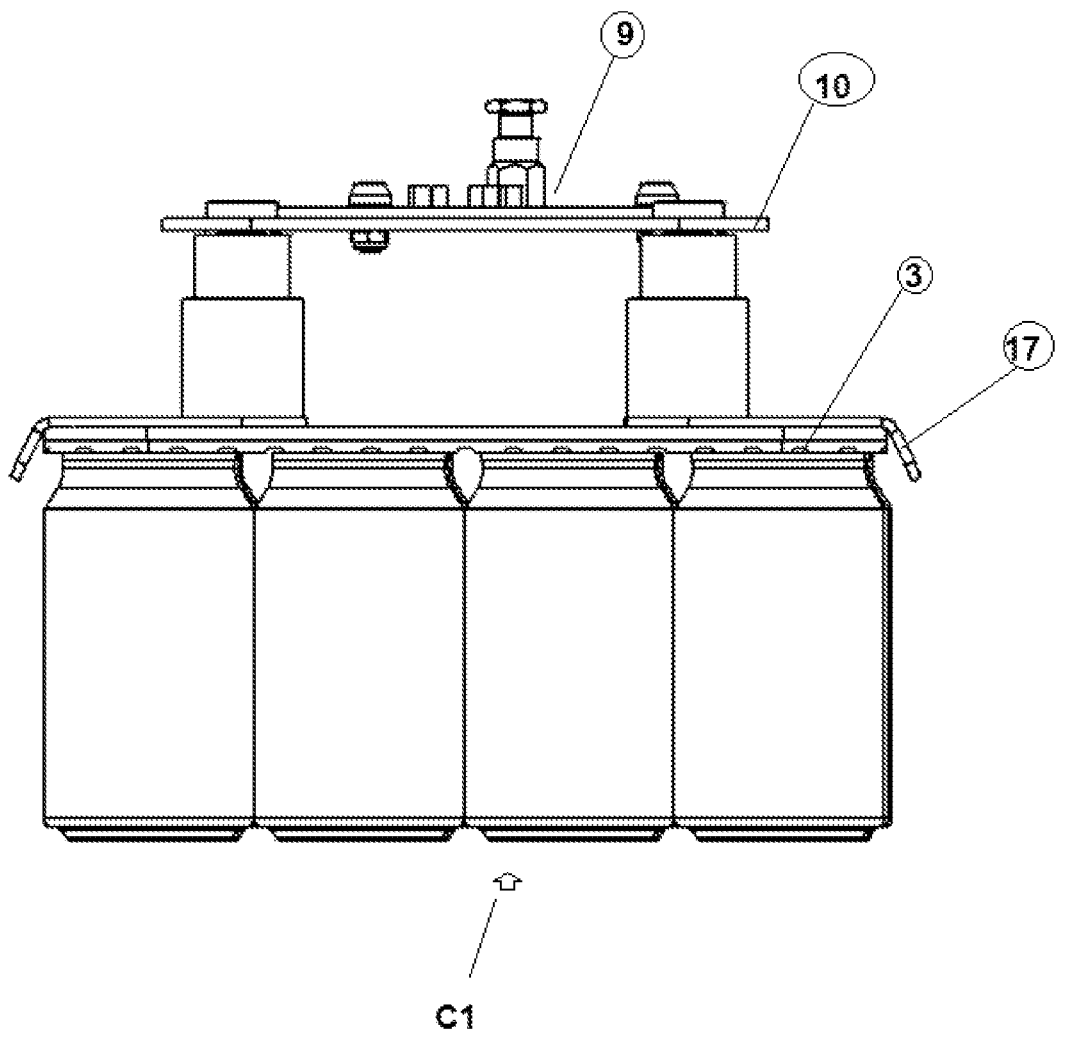
Figure 15:
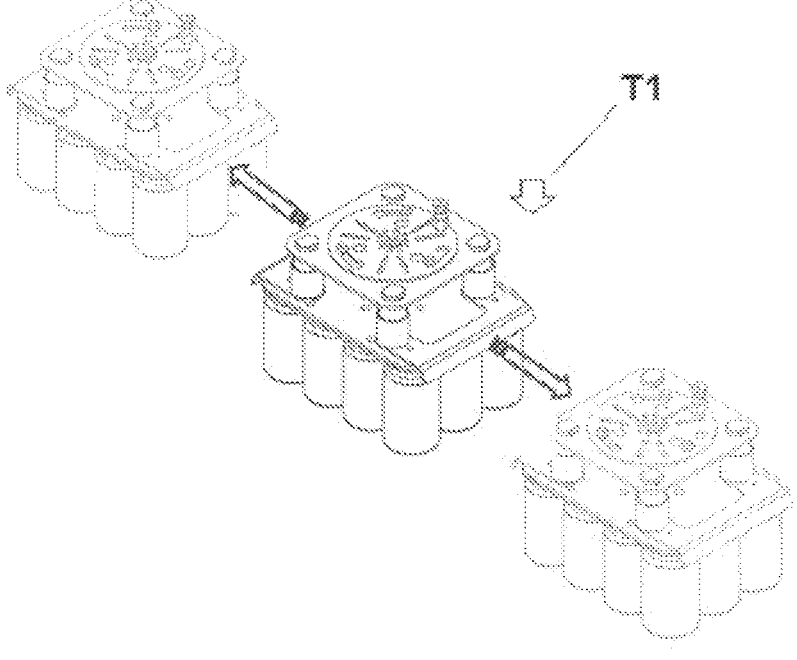
Figure 16:
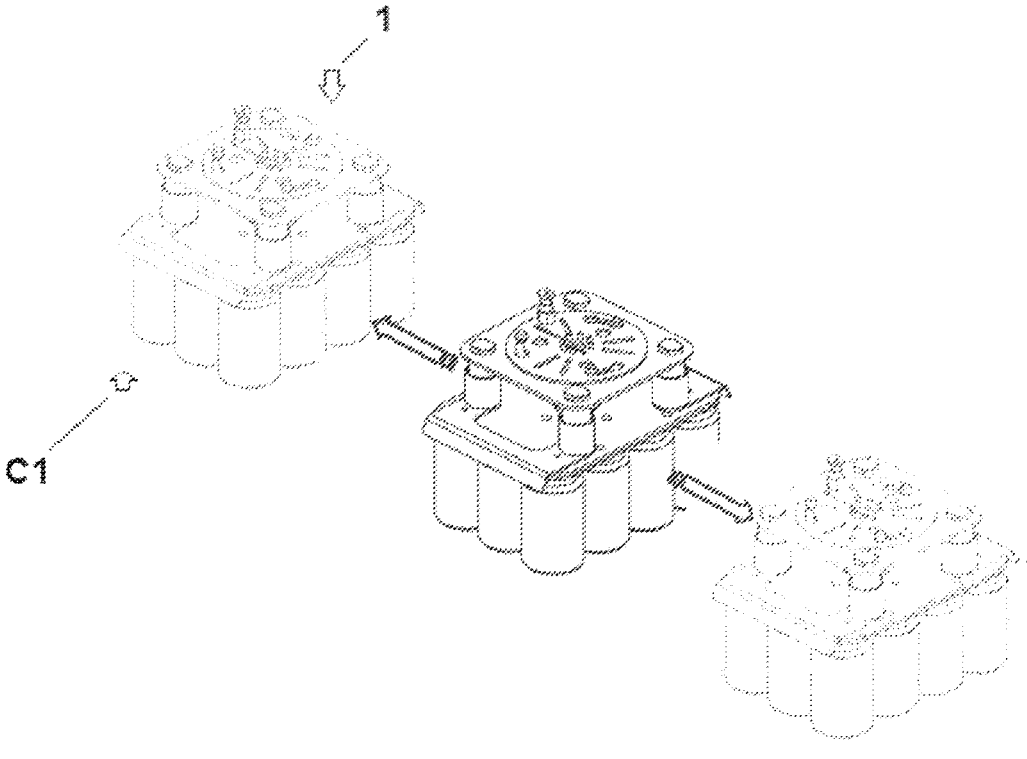
Figure 17:
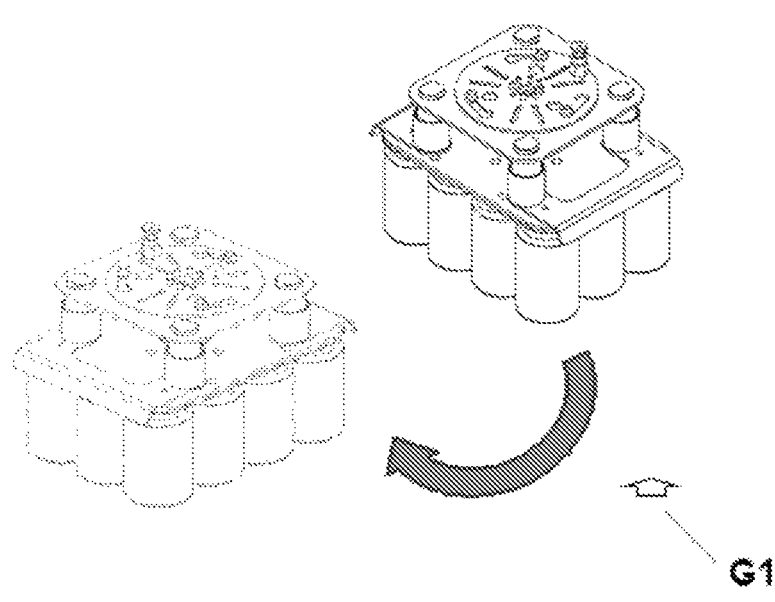
Figure 18:
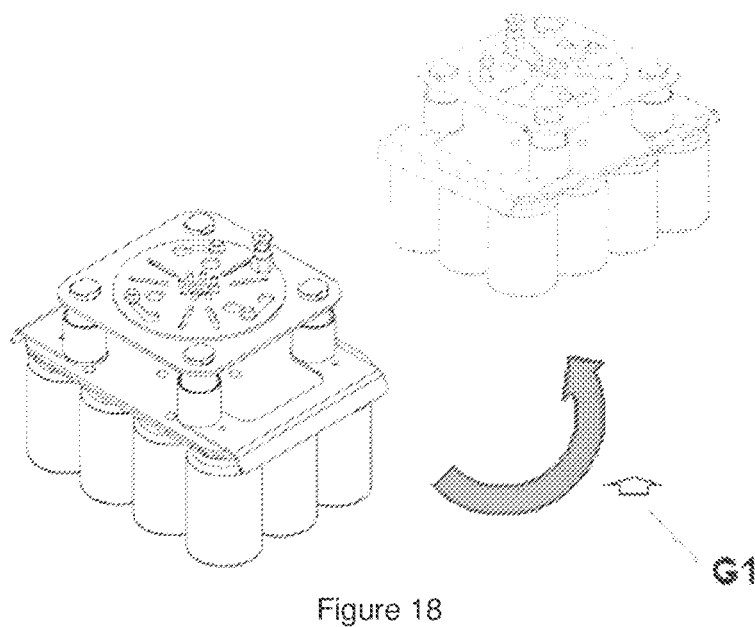
Figure 19:
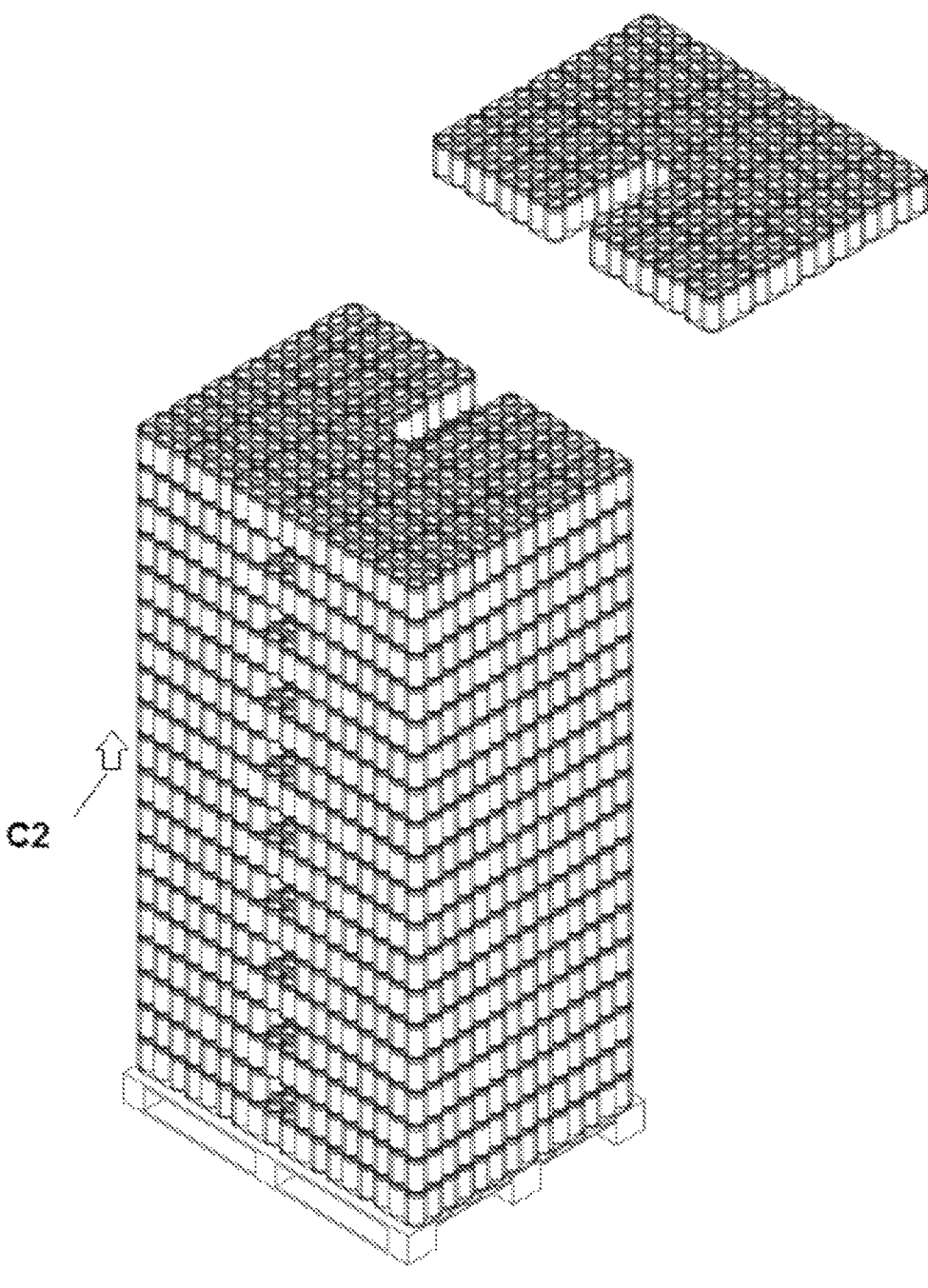
Figure 20:
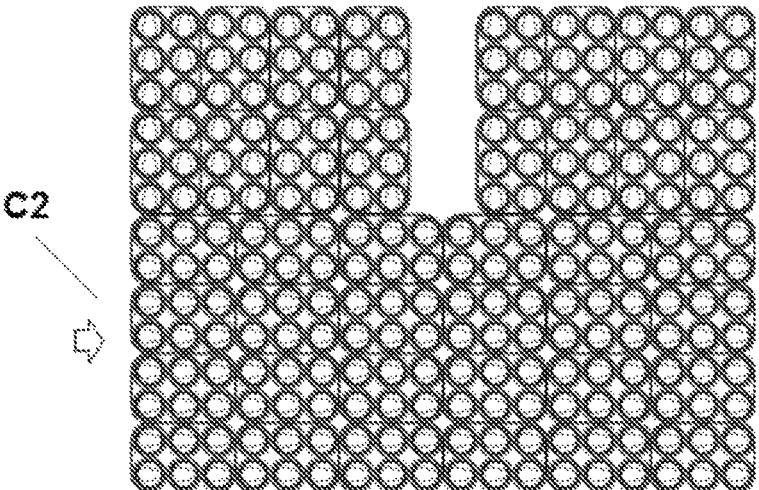
Figure 21:
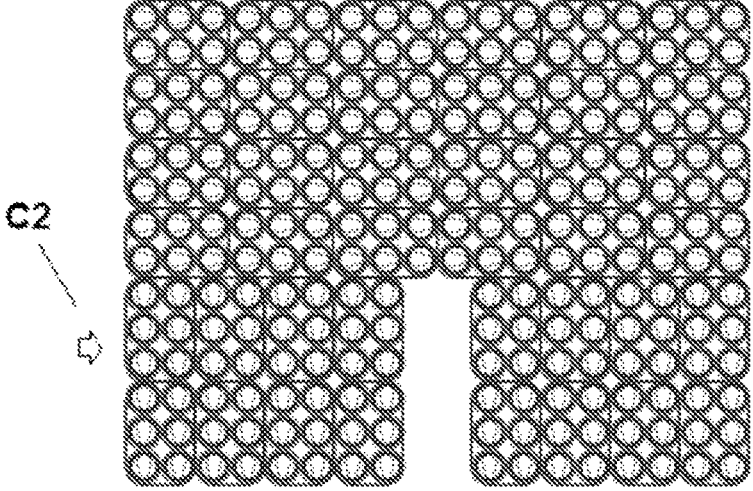
Figure 22:
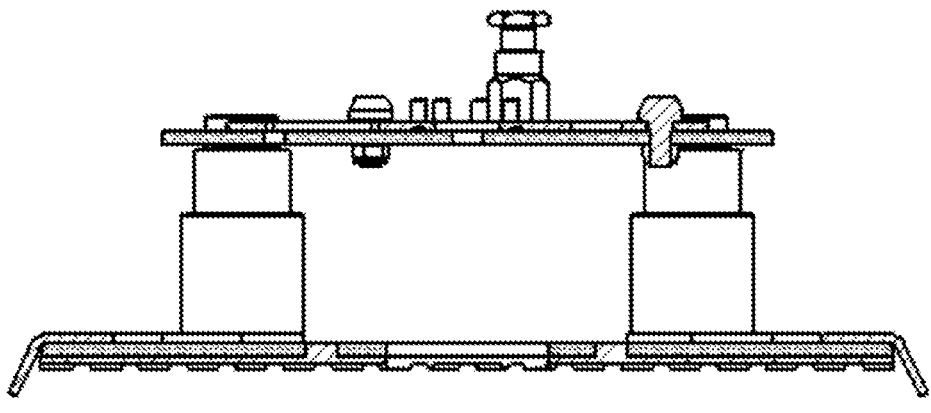
Figure 23:
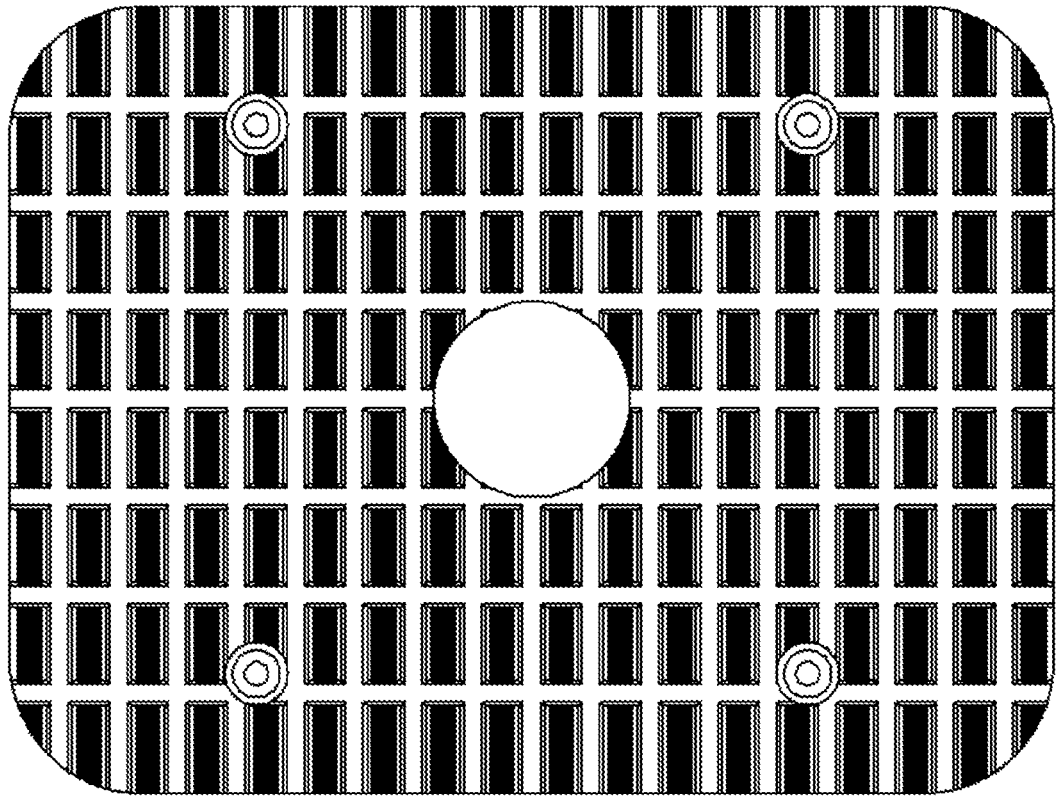
Figure 24:
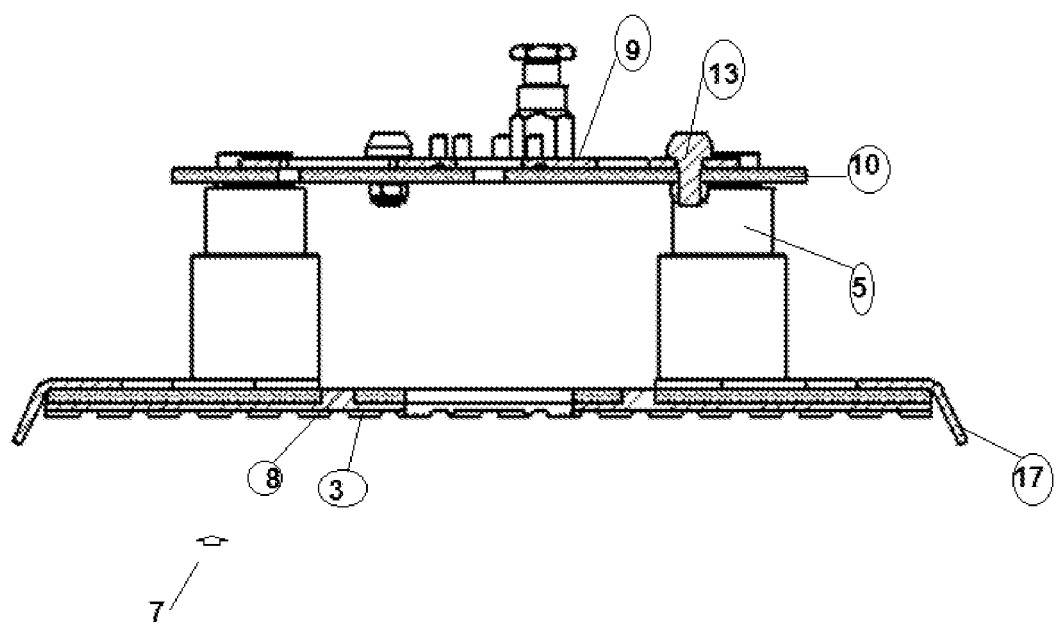

For better understanding of the present utility model, it will be disclosed in figures as follows:

FIG. 1: perspective view of the device;
FIG. 2: perspective view of the upper flange;
FIG. 3: perspective view of the upper plate;
FIG. 4: exploded perspective view;
FIG. 5: side view of the device;
FIG. 6: upper view of the device;
FIG. 7: perspective and side views of the sleeve;
FIG. 8: perspective and side views of the lower sleeve;
FIG. 9: perspective view of the compression spring;
FIG. 10: perspective view of the base plate;
FIG. 11: upper view of the base plate;
FIG. 12: upper view of the guide pin;
FIG. 13: perspective view of the device coupled to a can container;
FIG. 14: side view of the device coupled to a can container;
FIG. 15: perspective view showing the crosswise movement of the device while in use;
FIG. 16: perspective view showing the lengthwise movement of the device while in use;
FIG. 17: perspective view showing the rotating movement of the device clockwise;
FIG. 18: perspective view showing the rotating movement of the device anti-clockwise;
FIG. 19: perspective view of a mosaic formed by containers assembled over a pallet;
FIG. 20: upper view of the mosaic;
FIG. 21: mirrored upper view of the mosaic of the previous figure;
FIG. 22: front view of the device;
FIG. 23: lower view of the device; and
FIG. 24: back view of the device.

The invention claimed is:

1. A method for handling products in containers based on controlling movement of the containers by the use of elastic pressure on the top of the containers, wherein a device for handling products in containers comprises a metal head attached to a metal frame, comprising a base set and a flange, to engage a movement set or robot, wherein, in a lower part of the base set of the device, a set constituted by a lower metal plate and covered with an elastic polymer is assembled, having its design changed into a checkerboard, aiming to assure more efficient friction between a claw and the container, after fixing the base set to an upper plate of the device, by means of a spring system, wherein said system, comprised by bolts and pins, besides the essential constituents joining the lower metal plate to the upper plate, considering that the connection as disclosed above is performed in four spots with holes, next to vertices of the upper plate, coincident with fixing spots to the base set, being fixed to the upper plate by innovative locking pins for said flange; wherein the device further comprises a connection performed by means of a lower sleeve receiving the spring and a guide pin, projecting from the sleeve which is coupled to the upper plate and, between the plate and the lower sleeve, two side wings are assembled, and thus the course of the system was increased, giving better flexibility to the system and the pin, which was relieved in its diameter, so to avoid locking during operation, and consequently a protection ability for the robot against excessive torque was also improved, wherein the locking pins receiving the set of locks constituted by the flange used for engagement to a mouth of the robot are located on a middle of the upper plate; furthermore, innovative side wings were incorporated to drag the container, thus reducing a friction coefficient over the conveyor.

2. The method for handling products in containers based on controlling movement of the containers by the use of elastic pressure on the top of the containers of claim 1, wherein the method is adapted to organize said containers in groups and move said groups in preparation for subsequent operations, including the formation of palletization layers, the method comprising (i) providing the device for handling products in containers comprising the metal frame having an upper part and the lower part, attached to a compression spring system coupled to the flange of the robot, and the two side wings attached to the edges of the frame, and an elastic polymer cover coupled to the lower part of the device adapted to maintain position of the containers while allowing their movement, wherein the lower part of the device is smaller than measurements of the container to be handled; and (ii) performing the steps of exerting pressure by the elastic polymer cover upon the containers, and guiding the containers using the two side wings so as to organize said containers in groups and form of palletization layers.

\* \* \* \* \*